(12) United States Patent
Kim et al.

(10) Patent No.: US 11,441,673 B2
(45) Date of Patent: Sep. 13, 2022

(54) ECO-FRIENDLY VEHICLE AND TRANSMISSION HYDRAULIC PRESSURE CONTROL METHOD FOR THE SAME

(71) Applicants: Hyundai Motor Company, Seoul (KR); Kia Motors Corporation, Seoul (KR)

(72) Inventors: Kyung Su Kim, Chungcheongnam-do (KR); Hyeon Jun Kim, Gyeonggi-do (KR); Yong Hyun Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 476 days.

(21) Appl. No.: 16/696,444

(22) Filed: Nov. 26, 2019

(65) Prior Publication Data

US 2020/0284341 A1 Sep. 10, 2020

(30) Foreign Application Priority Data

Mar. 8, 2019 (KR) .................. 10-2019-0026596

(51) Int. Cl.
*F16H 61/00* (2006.01)
*F16H 57/04* (2010.01)
*B60W 20/00* (2016.01)
*B60W 10/30* (2006.01)
*F04C 28/28* (2006.01)
(Continued)

(52) U.S. Cl.
CPC ......... *F16H 61/0025* (2013.01); *B60W 10/04* (2013.01); *B60W 10/30* (2013.01); *B60W 20/00* (2013.01); *F04C 28/28* (2013.01); *F16H 57/0412* (2013.01); *F16H 59/18* (2013.01); *B60W 2510/30* (2013.01); *B60W 2540/10* (2013.01); *B60W 2710/0666* (2013.01);
(Continued)

(58) Field of Classification Search
CPC .. F16H 61/0025; F16H 57/0412; F16H 59/18; F16H 59/72; F16H 59/14; F16H 59/78; B60W 10/04; B60W 10/30; B60W 20/00; B60W 2510/30; B60W 2540/10; B60W 2710/0666; B60W 2710/083; B60W 10/103; B60W 50/10; F04C 28/28; F01M 2001/0215; F01M 2011/1473
See application file for complete search history.

(56) References Cited

U.S. PATENT DOCUMENTS

2019/0048997 A1* 2/2019 Harada .................. H02P 29/68

FOREIGN PATENT DOCUMENTS

| JP | 2010195313 A | * | 9/2010 |
| JP | 2018076847 A | * | 5/2018 |
| KR | 20170108207 A | * | 9/2017 |

* cited by examiner

*Primary Examiner* — Justin Holmes
(74) *Attorney, Agent, or Firm* — Fox Rothschild LLP

(57) ABSTRACT

An eco-friendly vehicle and a transmission hydraulic pressure control method for the same are provided. The vehicle includes an oil pump that estimates an inner temperature without using a temperature sensor. The method includes determining a driver request output and determining a required hydraulic pressure corresponding to the request output. A temperature of an oil pump unit is estimated to operate an electric oil pump to supply a hydraulic pressure to a transmission, based on the required hydraulic pressure and driving status information. An output torque is then adjusted based on the estimated temperature.

15 Claims, 4 Drawing Sheets

(51) Int. Cl.
*F16H 59/18* (2006.01)
*B60W 10/04* (2006.01)
*F01M 11/10* (2006.01)
*F01M 1/02* (2006.01)

(52) U.S. Cl.
CPC ............... *B60W 2710/083* (2013.01); *F01M 2001/0215* (2013.01); *F01M 2011/1473* (2013.01)

FIG. 5

| Tq_req[Nm] | \multicolumn{4}{c}{OPU_temp_est = $(A*T\_ch)*(B*Tq\_req^2+C*Tq\_req+D)$} |
|---|---|---|---|---|
| Tq_req[Nm] | A | B | C | D |
| 0 | A1 | B1 | C1 | D1 |
| 50 | A2 | B2 | C2 | D2 |
| 100 | A3 | B3 | C3 | D3 |
| 150 | A4 | B4 | C4 | D4 |
| 200 | A5 | B5 | C5 | D5 |
| 250 | A6 | B6 | C6 | D6 |
| 300 | A7 | B7 | C7 | D7 |

ECO-FRIENDLY VEHICLE AND TRANSMISSION HYDRAULIC PRESSURE CONTROL METHOD FOR THE SAME

CROSS-REFERENCE TO RELATED APPLICATION(S)

This application claims the benefit of Korean Patent Application No. 10-2019-0026596 filed on Mar. 8, 2019, which is hereby incorporated by reference as if fully set forth herein.

BACKGROUND

Field of the Invention

The present invention relates to an eco-friendly vehicle and a transmission hydraulic pressure control method for the same, and more particularly to an eco-friendly vehicle including an oil pump that estimates an inner temperature without using a temperature sensor and a transmission hydraulic pressure control method for the eco-friendly vehicle.

Discussion of the Related Art

In pace with recently increased interest in the environment, active research into eco-friendly vehicles capable of enhancing fuel economy while reducing exhaust gas has been conducted. Representative examples of such eco-friendly vehicles include an electric vehicle (EV) and a hybrid electric vehicle (HEV).

In general, the hybrid electric vehicle refers to a vehicle using two types of power sources. Particularly, the two types of power sources are mainly an engine and an electric motor. A hybrid electric vehicle exhibits superior fuel economy and superior power performance, and is also advantageous in terms of a reduction in exhaust gas, compared to vehicles including only an internal combustion engine. Accordingly, active development has recently been conducted regarding to hybrid electric vehicles. Meanwhile, the electric vehicle refers to a vehicle driven only by power from an electric motor without using an engine.

The above-mentioned eco-friendly vehicles may be equipped with an electric oil pump (EOP) adapted to supply an amount of oil corresponding to a required output, to a transmission, for example, an automatic transmission (AT), to achieve an enhancement in the efficiency of the transmission and an enhancement in electricity economy/fuel economy. Typically, the electric oil pump may be operated by an oil pump unit (OPU). However, it is important to prevent the oil pump unit from being damaged by heat, through temperature monitoring, since elements, for example, an insulated gate bipolar transistor (IGBT), a coil, etc., constituting an inner module of the oil pump unit may be damaged when the oil pump unit is exposed to a high temperature based on driving environments or running environments.

In a general oil pump unit, an inner temperature of the oil pump unit is monitored by a temperature sensor attached to an inner power module side of the oil pump unit and, as such, damage by heat is prevented through protective operation to limit a hydraulic pressure and a vehicle output in an excessive temperature situation. In such a system, however, real-time temperature measurement may be impossible when the temperature sensor fails or malfunctions. In particular, it may be difficult to activate protective operation. When protective operation is impossible, failure of elementary components of the oil pump unit may occur. In a severe case, the vehicle may catch fire. Furthermore, although it may be possible to detect whether the temperature sensor fails, protective operation may be activated even when no excessive temperature situation has occurred, to limit the output of the vehicle.

SUMMARY

Accordingly, the present invention is directed to an eco-friendly vehicle and a transmission hydraulic pressure control method for the same that substantially obviate one or more problems due to limitations and disadvantages of the related art. An object of the present invention is to provide an eco-friendly vehicle capable of estimating the temperature of an oil pump unit in real time without using a temperature sensor and a transmission hydraulic pressure control method for the eco-friendly vehicle.

Another object of the present invention is to provide an eco-friendly vehicle capable of determining whether protective operation should be executed, based on the temperature of an oil pump unit estimated in real time and a transmission hydraulic pressure control method for the eco-friendly vehicle.

Additional advantages, objects, and features of the exemplary embodiments will be set forth in part in the description which follows and in part will become apparent to those having ordinary skill in the art upon examination of the following or may be learned from practice of the exemplary embodiments. The objectives and other advantages of the embodiments may be realized and attained by the structure particularly pointed out in the written description and claims hereof as well as the appended drawings.

To achieve these objects and other advantages and in accordance with the purpose of the exemplary embodiments, as embodied and broadly described herein, a transmission hydraulic pressure control method for an eco-friendly vehicle may include determining a driver request output, determining a required hydraulic pressure corresponding to the request output, estimating a temperature of an oil pump unit to operate an electric oil pump to supply a hydraulic pressure to a transmission, based on the required hydraulic pressure and driving status information, and adjusting an output torque based on the estimated temperature.

In another aspect of the present invention, an eco-friendly vehicle may include an electric oil pump configured to supply a hydraulic pressure to a transmission; and an oil pump unit configured to acquire a driver request output, determine a required hydraulic pressure corresponding to the request output, estimate an inner temperature based on the required hydraulic pressure and driving status information, and adjust an output torque based on the estimated temperature, while operating the electric oil pump.

The eco-friendly vehicle associated with at least one of the exemplary embodiments of the present invention configured as described above may be configured to estimate the temperature of the oil pump unit in real time through combination of various conditions. Accordingly, it may be possible to determine whether protective driving is executed, based on the temperature estimated by the oil pump unit, irrespective of whether a temperature sensor is provided or whether the temperature sensor fails. Accordingly, it may be possible to prevent damage or fire of the oil pump unit.

Effects of the present disclosure are not limited to the above-described effects. Other effects not described in the present disclosure may be readily understood by those skilled in the art through the following description. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and along with the description serve to explain the principle of the invention. In the drawings:

FIG. 5 is a table illustrating an example of a real-time hydraulic pressure estimation model according an exemplary embodiment of the present invention.

DETAILED DESCRIPTION

Figure 1:
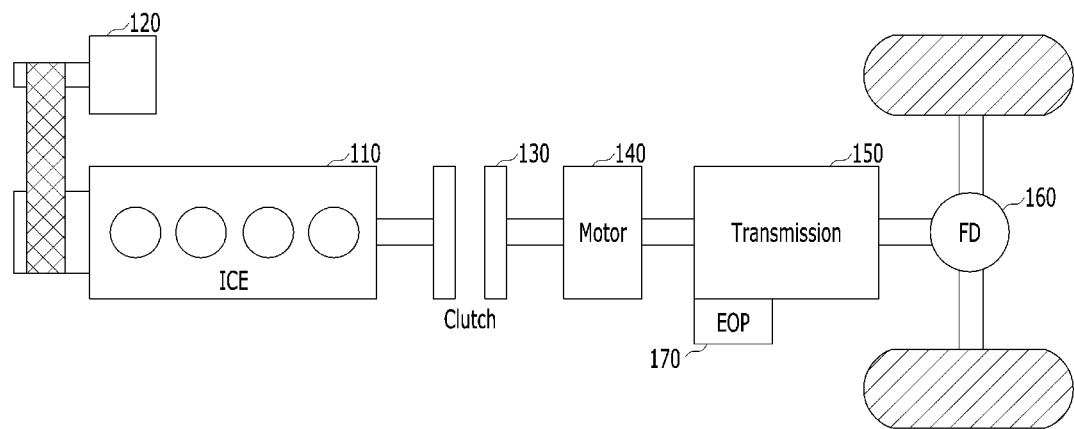
FIG. 1 is a diagram illustrating an example of a power train structure of a hybrid electric vehicle, to which exemplary embodiments of the present invention are applicable.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings and, as such, may be easily implemented by one of ordinary skill in the art to which the present invention pertains. The present invention may be embodied in many different forms and should not be construed as limited to the exemplary embodiments set forth herein. Matters having no concern with the invention will be omitted for clarity of explanation. The same or similar elements are designated by the same reference numerals throughout the specification.

The terms "including", "comprising", "having" and variations thereof disclosed herein mean "including but not limited to" unless expressly specified otherwise, and, as such, should not be construed to exclude elements other than the elements disclosed herein and should be construed to further include additional elements. Elements designated by the same reference numerals throughout the specification mean the same constituent elements.

Exemplary embodiments of the present invention propose an eco-friendly vehicle capable of estimating the temperature of an oil pump unit in real time, based on a driving state of the vehicle and an output desired by the driver, and determining whether protective operation should be executed, based on the estimated temperature of the oil pump unit, and a transmission hydraulic pressure control method for the eco-friendly vehicle.

Prior to description of a transmission hydraulic pressure control method according to an exemplary embodiment of the present invention, a structure and a control system in an eco-friendly vehicle, to which exemplary embodiments of the present invention are applicable, will be described.

FIG. 1 illustrates an example of a power train structure of a hybrid electric vehicle, to which exemplary embodiments of the present invention are applicable. Referring to FIG. 1, a power train of a hybrid electric vehicle is illustrated. The illustrated power train employs a parallel type or transmission mounted electric drive (TMED) hybrid system in which an electric motor (or a drive motor) 140 and an engine clutch 130 are mounted between an internal combustion engine (ICE) 110 and a transmission 150.

Generally, in such a vehicle, when the driver engages an accelerator pedal after an engine starts, the motor 140 is first driven using electric power from a battery in an opened state of the engine clutch 130. Power from the motor 140 is transmitted to wheels via the transmission 150 and a final drive (FD) 160 and, as such, the wheels are driven (e.g., an electric vehicle (EV) mode). When higher driving force is required as the vehicle is gradually accelerated, an auxiliary motor (or a starter generator motor) 120 may be operated to drive the engine 110.

When rotation speeds of the engine 110 and the motor 140 become equal in accordance with the above-described operation, the engine clutch 130 transitions to an engagement state and, as such, the engine 110 drives the vehicle together with the motor 140, or the engine 110 drives the vehicle alone (e.g., transition from the EV mode to a hybrid electric vehicle (HEV) mode). When a predetermined engine-off condition is satisfied based on, for example, speed reduction of the vehicle or the like, the engine clutch 130 is opened and the engine 110 is stopped (e.g., transition from the HEV mode to the EV mode). In addition, in the vehicle, driving force of the wheels is converted into electrical energy during braking and the electrical energy may be used to recharge the battery. This operation is referred to as "braking energy recovery" or "regenerative braking".

The starter generator motor 120 may be configured to operate as a starter motor when engine start is performed, and operate as a generator after the engine starts or when rotational energy of the engine is recovered in an engine-off state. In this regard, the starter generator motor 120 may be referred to as a "hybrid starter generator (HSG)". In some cases, the starter generator motor 120 may be referred to as an "auxiliary motor". Meanwhile, an electric oil pump (EOP) 170 may be mounted in the transmission 150 and a hydraulic pressure (hereinafter, for convenience, referred to as "TransP_req" or "required hydraulic pressure") may be supplied from the electric oil pump 170 to the transmission 150 based on vehicle output.

Figure 2:
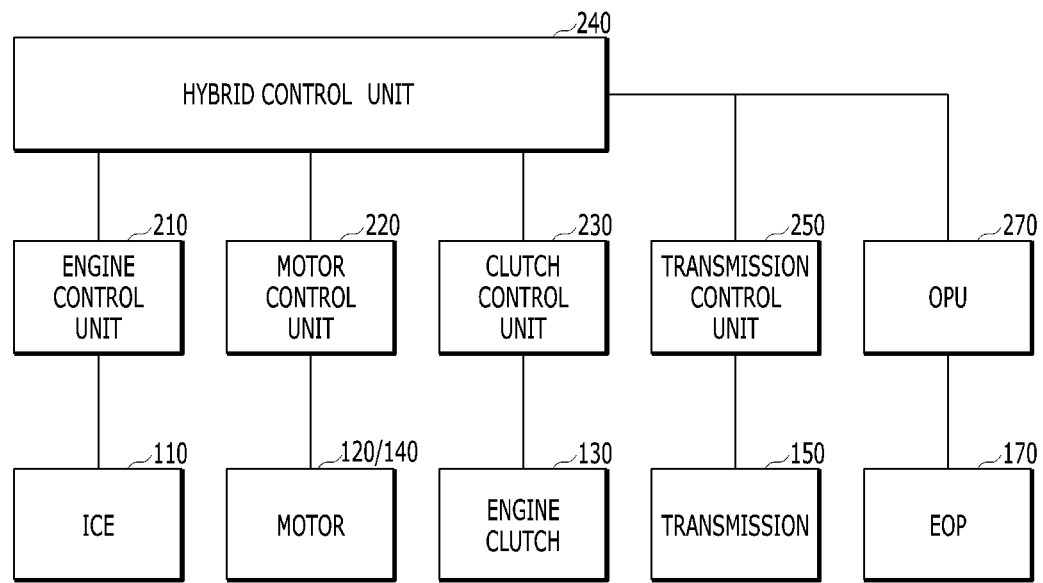
FIG. 2 is a block diagram illustrating an example of a control system in a hybrid electric vehicle to which exemplary embodiments of the present invention are applicable.

Co-relation between controllers in a vehicle to which the above-described power train is applied is illustrated in FIG. 2. FIG. 2 is a block diagram illustrating an example of a control system in a hybrid electric vehicle to which exemplary embodiments of the present invention are applicable.

Referring to FIG. 2, in the hybrid electric vehicle to which exemplary embodiments of the present invention are applicable, the internal combustion engine 110 may be operated by an engine control unit 210 (e.g., engine controller), and the starter generator motor 120 and the electric motor 140 may be operated by a motor control unit (MCU) 220 (e.g., motor controller). In addition, the engine clutch 130 may be operated by a clutch control unit 230 (e.g., clutch controller). In particular, the engine controller 210 is also referred to as an "engine management system (EMS)". In addition, the transmission 150 may be operated by a transmission control unit 250 (e.g., transmission controller). If necessary, the starter generator motor 120 and the electric motor 140 may be operated by separate controllers, respectively. In addition, the electric oil pump 170 may be operated by an oil pump unit (OPU) 270.

The controllers as described above may be connected to a hybrid control unit (HCU) 240 to execute overall mode transition, which is an upper-level controller, and, as such, may be configured to supply information required for changing a driving mode, information required for engine clutch control upon gear shifting and/or information required for engine stop under the operation of the hybrid controller unit 240 or may be configured to execute operation in accordance with control signals received from the hybrid controller 240.

Particularly, the hybrid controller 240 may be configured to determine whether to execute a mode transition based on a driving state of the vehicle. For example, the hybrid controller 240 may be configured to determine a time when the engine clutch 130 is opened. When the engine clutch 130 is opened, the hybrid controller 240 may be configured to execute hydraulic pressure control e.g., (in the case of a wet type engine clutch (EC)) or torque capacity control (in the case of a dry type EC).

In addition, the hybrid controller 240 may be configured to determine an EC state (e.g., lock-up, slip, open, etc.) and, as such, adjust a time when fuel injection into the engine 110 is stopped. Furthermore, the hybrid controller 240 may be configured to transmit, to the motor controller 220, a torque command for adjusting a torque of the starter generator motor 120 for engine stop, thereby controlling recovery of engine rotation energy. In addition, the hybrid controller 240 may be configured to determine mode transition conditions, and operate the lower-level controllers for mode transition upon execution of driving mode transition.

Of course, it will be appreciated by those skilled in the art that connection relations among the above-described controllers and functions/definitions of respective controllers are illustrative and, as such, the controllers are not limited by names thereof. For example, the function of the hybrid controller 240 may be realized by any one of the remaining controllers or may be provided by two or more of the remaining controllers in a distributed manner. In addition, in an exemplary embodiment, the oil pump unit 270 may be embodied as a lower-level controller of the transmission controller 250, without being limited thereto. For the oil pump unit 270, any controller may be employed, so long as a driver request output and a request torque are acquired. In addition, in an electric vehicle, the hybrid controller 240 may be replaced by a vehicle control unit (VCU).

Figure 3:
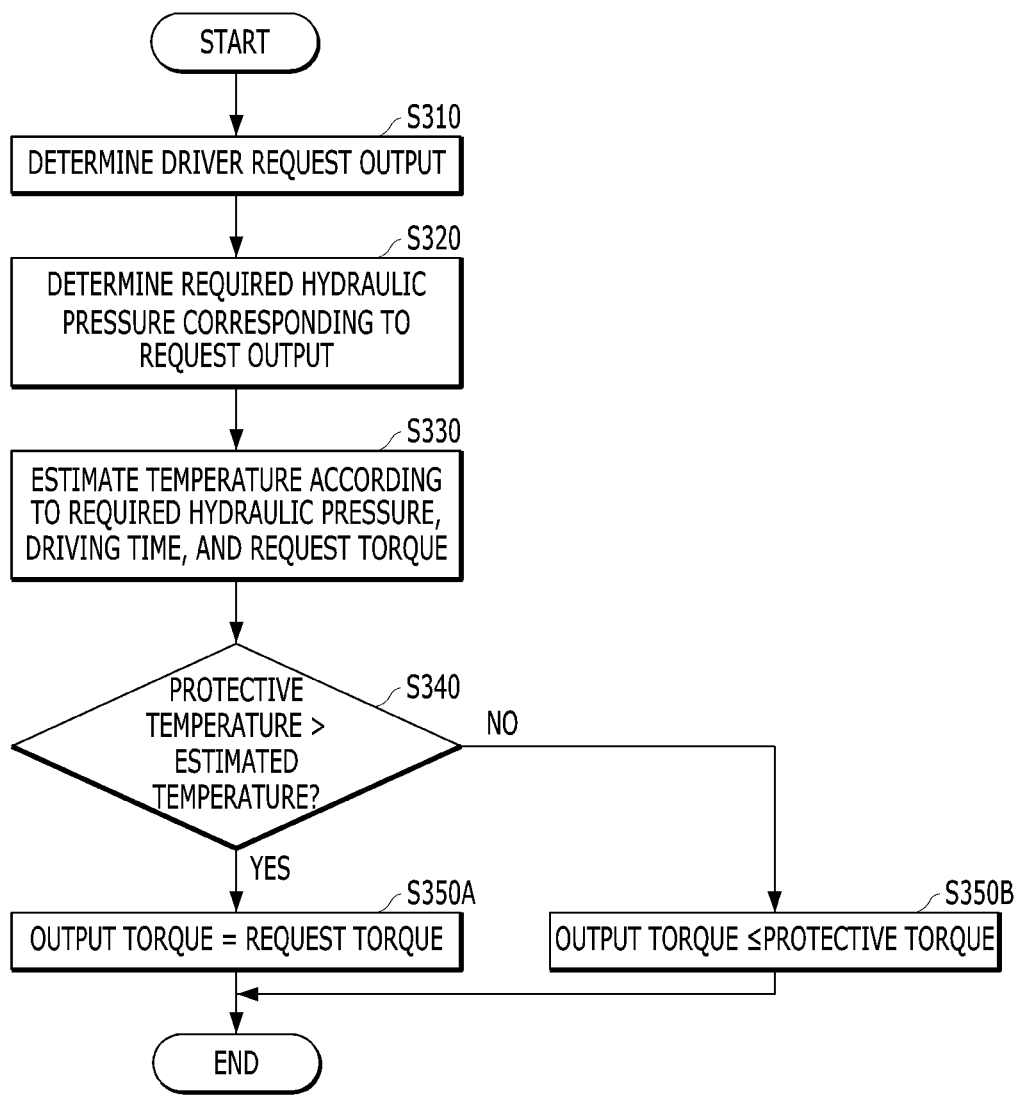
FIG. 3 is a flowchart illustrating an example of a transmission hydraulic pressure control procedure based on real-time temperature estimation according to an exemplary embodiment of the present invention.
Figure 4:
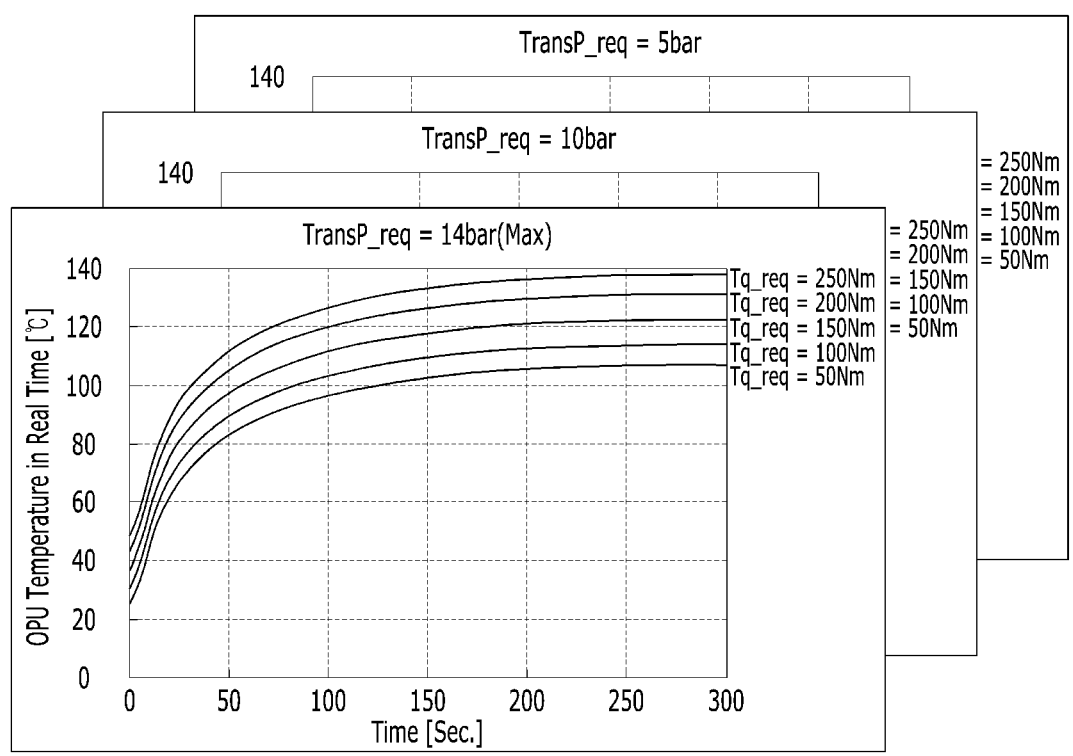
FIG. 4 is a graph illustrating an example of results of temperature measurement of an oil pump unit executed at different hydraulic pressures with passage of time according an exemplary embodiment of the present invention.

Hereinafter, a transmission hydraulic pressure control procedure according to an exemplary embodiment of the present invention will be described with reference to FIGS. 3 to 5. FIG. 3 is a flowchart illustrating an example of the transmission hydraulic pressure control procedure based on real-time temperature estimation according to the embodiment of the present invention.

Referring to FIG. 3, a driver request output may be determined first (S310). The driver request output may be derived, based on a depression or engagement amount of the accelerator pedal by the driver, for example, an accelerator pedal sensor (APS) value. Determination of the engagement amount of the accelerator pedal may be managed by the hybrid controller 240. However, if the APS value may be derived, determination of the engagement amount of the accelerator pedal may be executed in the oil pump unit 270.

When a driver request output is derived, a required hydraulic pressure TransP-req corresponding to the derived driver request output may be determined using the oil pump unit 270 (S320). For example, the oil pump unit 270 may refer to a table in which required hydraulic pressures are defined based on predetermined driver request outputs, but is not limited thereto.

When a required hydraulic pressure is determined, the oil pump unit 270 may be configured to estimate an inner temperature, based on information regarding a vehicle situation together with the determined required hydraulic pressure (S330). In particular, the vehicle situation information may include an operation time Time_ch and a request torque Tq_req. In addition, the vehicle situation information may be externally acquired, and at least a part thereof may be managed directly.

For example, the request torque Tq_req may be acquired in the hybrid controller 240 or the transmission controller 250. The operation time information may be acquired using a method of accumulating the time for which the oil pump unit 270 drives the electric oil pump 170. Notably, acquisition of the request torque Tq_req and operation time information is not limited to the above-described conditions. In addition, the request torque Tq_req may refer to an output torque of the transmission to satisfy a driver request torque or the driver request torque.

An inner temperature estimation method will be described later with reference to FIGS. 4 and 5. Meanwhile, when an estimation temperature OPU_temp_est of the oil pump unit 270 is derived, the oil pump unit 270 may be configured to determine whether the estimation temperature OPU_temp_est is less than a protective temperature (S340). In particular, the protective temperature may refer to a limitative temperature for protection of internal elements (e.g., prevention of damage caused by heat), and may be a predetermined value.

When the estimation temperature is less than the protective temperature ("Yes" in S340), the request torque may be determined as an output torque (S350A). On the other hand, when the estimation temperature is greater than the protective temperature ("No" in S340), the request torque may be limited to be less than the protective torque (S350B). Particularly, the protective torque is a value that corresponds to a hydraulic pressure capable of preventing the oil pump unit 270 from being heated to an excessive temperature, and may be a predetermined value. For such operation, the oil pump unit 270 may be configured to output a notification to the hybrid controller 240 of the results of the comparison in operation S340.

Accordingly, the hybrid controller 240 may be configured to transmit, to the engine controller 210 and/or the motor controller 220, a desired torque command to generate an output torque meeting the request torque or to limit the output torque to be less than the protective torque. Of course, the oil pump unit 270 may also be configured to operate the electric oil pump 170 based on results of the comparison in operation S340, to enable the hydraulic pressure corresponding to the request torque or the protective torque to be supplied to the transmission 150.

Hereinafter, the real-time temperature estimation method of the oil pump unit 270 will be described with reference to FIGS. 4 and 5. FIG. 4 illustrates an example of results of temperature measurement of the oil pump unit executed at different hydraulic pressures with passage of time. FIG. 5 illustrates an example of a real-time hydraulic pressure estimation model according an exemplary embodiment of the present invention.

In the illustrated exemplary embodiment, a temperature model based on experimental values and interpolation may be applied for temperature estimation of the oil pump unit 270. First, for creation of a temperature model, data representing temperature variations exhibited with passage of a driving time Time_ch at different request torques Tq_req based on a required hydraulic pressure TransP_req is prepared, as illustrated in FIG. 4. Such data may be attained by individual vehicles through real-time collection, but it is preferred that the data be configured by a vehicle manufacturer through tests. Of course, the present invention is not limited to the above-described condition.

When data as described above is derived, it may be possible to derive a temperature estimation expression capable of generalizing the derived data based on a required hydraulic pressure TransP_req, as illustrated in FIG. 5. The estimation expression may be determined based on a correlation between a driving time and a temperature according to a request torque on a required hydraulic pressure basis. For example, the estimation expression illustrated in FIG. 5 takes the form of a multiplication of a driving time by a quadratic expression having a variable of a request torque, and at least one of each coefficient or each constant associated with the driving time and the quadratic expression may be previously prepared in the form of a table on a request torque basis. Of course, it will be appreciated by those skilled in the art that the illustrated estimation expression and the table configuration are illustrative, and may be diversely varied without limiting the present invention.

When the estimation expression and the table associated with coefficients and constants as described above are determined on a vehicle basis, the determined estimation expression and table may be stored in a memory (or firmware) of the oil pump unit 270. The oil pump unit 270 may be configured to estimate the temperature that corresponds to the current driving situation, based on the above-described estimation expression and table. When a request torque or a required hydraulic pressure does not correspond to the table, it may be possible to achieve real-time temperature estimation through interpolation.

Meanwhile, the present invention may be embodied as code, which may be written on a program-stored recording medium that may be read by a computer. The recording medium that may be read by a computer includes all types of recording media on which data that can be read by a computer system is written. Examples of recording media that can be read by a computer may be a hard disk drive (HDD), a solid state drive (SSD), a silicon disk drive (SDD), a read only memory (ROM), a random access memory (RAM), a CD-ROM, a magnetic tape, a floppy disk, an optical data storage, and the like.

Therefore, the above detailed description should be understood as exemplary rather than limiting in all aspects. The scope of the present invention should also be interpreted by the claims below. All modifications as would be derived from the equivalent concept intended to be included within the scope of the present invention should also be interpreted as falling within the scope of the invention.

What is claimed is:

1. A transmission hydraulic pressure control method for an eco-friendly vehicle, comprising:
    determining, by a controller, a driver request output;
    determining, by the controller, a required hydraulic pressure that corresponds to the request output;
    estimating, by the controller, a temperature of an oil pump unit to operate an electric oil pump to supply a hydraulic pressure to a transmission, based on the required hydraulic pressure and driving status information; and
    adjusting, by the controller, an output torque based on the estimated temperature.

2. The transmission hydraulic pressure control method according to claim 1, wherein the driving status information includes a driving time and a request torque.

3. The transmission hydraulic pressure control method according to claim 2, wherein the estimating of the temperature of the oil pump unit is executed using a previously prepared temperature estimation expression.

4. The transmission hydraulic pressure control method according to claim 3, wherein the temperature estimation expression is determined based on a correlation of between a driving time and a temperature according to the request torque on a required hydraulic pressure basis.

5. The transmission hydraulic pressure control method according to claim 1, wherein the adjusting of the output torque includes determining whether the estimated temperature is less than a predetermined protective temperature.

6. The transmission hydraulic pressure control method according to claim 5, further comprising:
    determining, by the controller, the request torque to be the output torque when the estimated temperature is determined to be less than the predetermined protective temperature, based on results of the determination.

7. The transmission hydraulic pressure control method according to claim 5, further comprising:
    limiting, by the controller, the output torque to be less than a predetermined protective torque when the estimated temperature is determined to be greater than the predetermined protective temperature, based on results of the determination.

8. A non-transitory computer-readable recording medium recorded with a program to execute the transmission hydraulic pressure control method according to claim 1.

9. An eco-friendly vehicle, comprising:
an electric oil pump configured to supply a hydraulic pressure to a transmission; and
an oil pump unit configured to acquire a driver request output, determine a required hydraulic pressure corresponding to the request output, estimate an inner temperature based on the required hydraulic pressure and driving status information, and adjust an output torque based on the estimated temperature, while operating the electric oil pump.

10. The eco-friendly vehicle according to claim 9, wherein the driving status information includes a driving time and a request torque.

11. The eco-friendly vehicle according to claim 10, wherein the oil pump unit is configured to estimate the inner temperature using a previously prepared temperature estimation expression.

12. The eco-friendly vehicle according to claim 11, wherein the temperature estimation expression is determined based on a correlation of between a driving time and a temperature according to the request torque on a required hydraulic pressure basis.

13. The eco-friendly vehicle according to claim 9, wherein the oil pump unit is configured to determine whether the estimated temperature is less than a predetermined protective temperature.

14. The eco-friendly vehicle according to claim 13, wherein the oil pump unit is configured to instruct a hybrid controller to determine the request torque to be the output torque when the estimated temperature is less than the predetermined protective temperature.

15. The eco-friendly vehicle according to claim 13, wherein the oil pump unit is configured to instruct a hybrid controller to limit the output torque to be less than a predetermined protective torque when the estimated temperature is greater than the predetermined protective temperature.

* * * * *